Dec. 25, 1923.  1,478,774
B. F. STOWELL ET AL
GUIDE DEVICE FOR BAND CUTTERS
Filed March 8, 1921  3 Sheets-Sheet 1
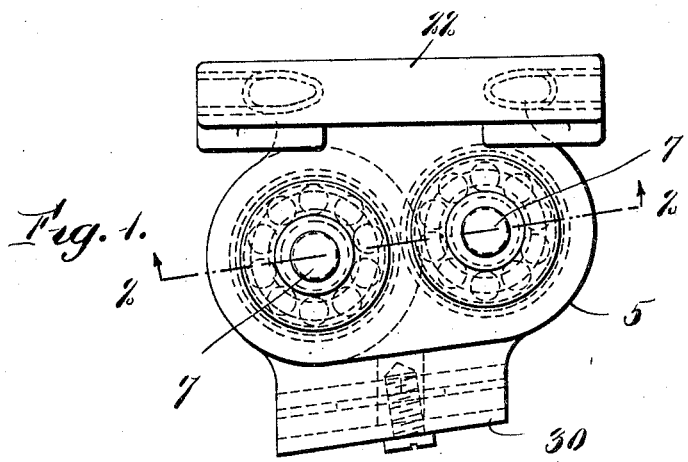
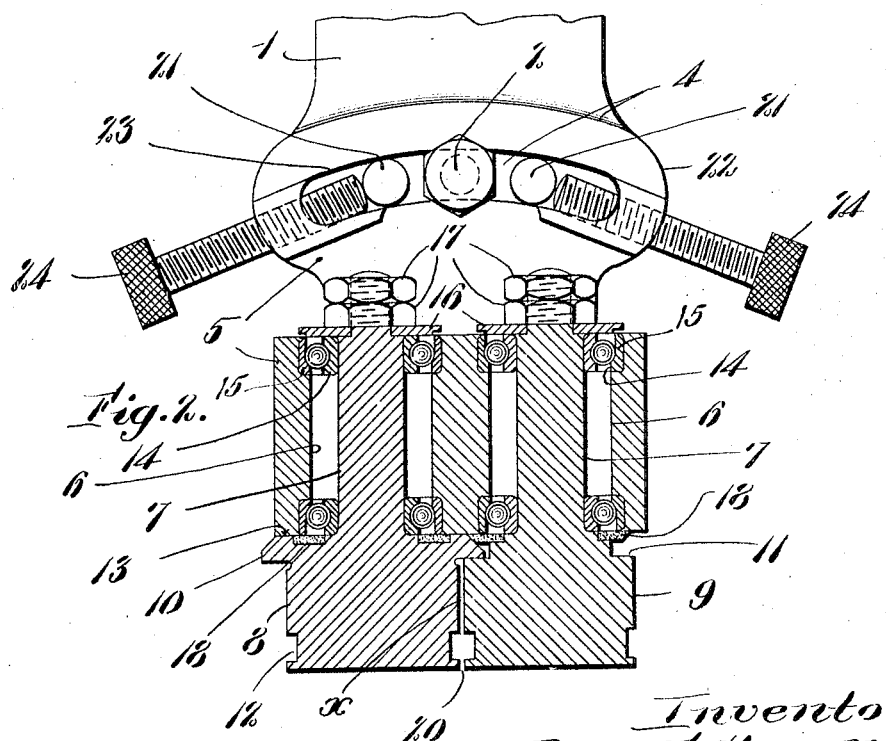
Inventors:
Byron F. Stowell
Howard L. Washburn

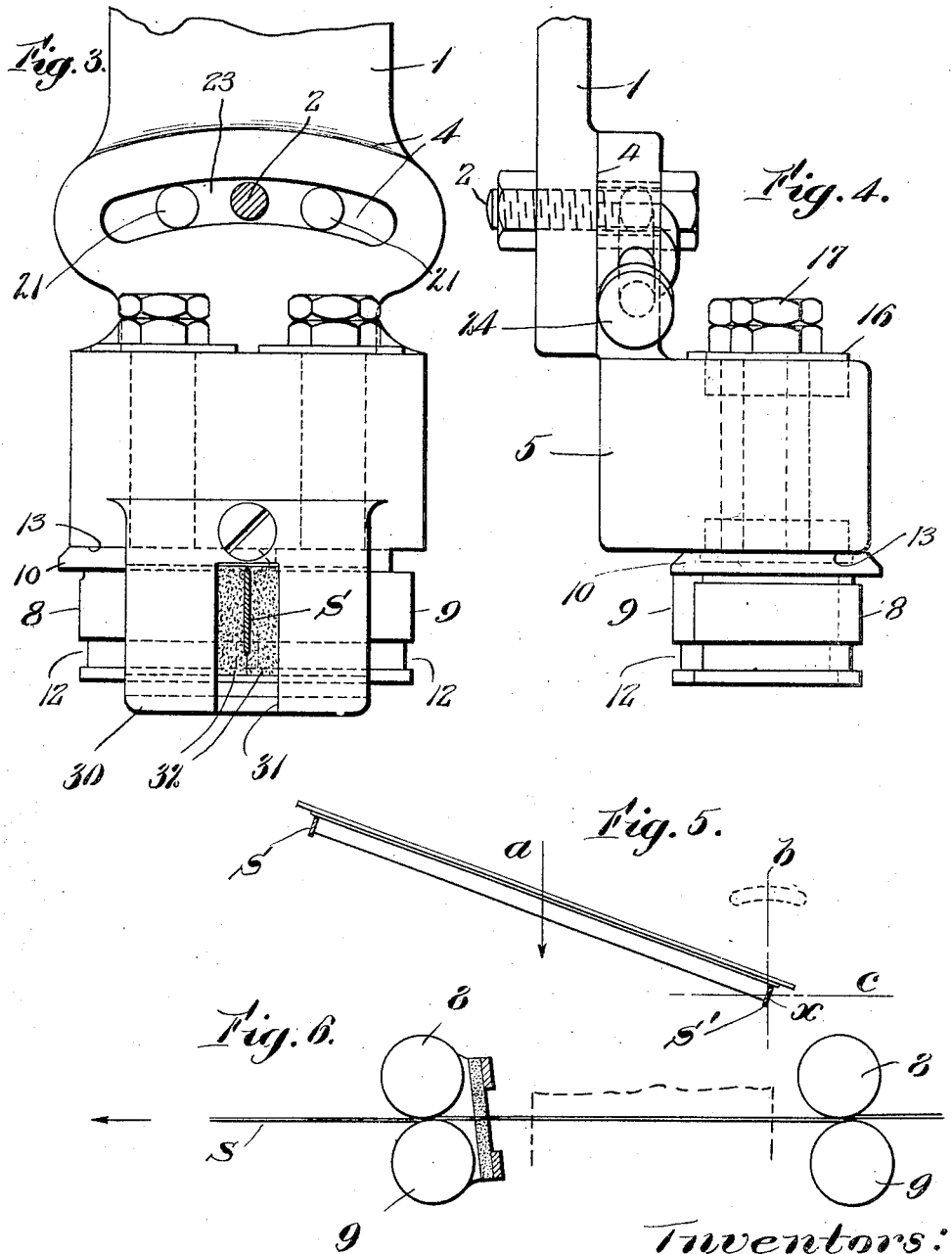

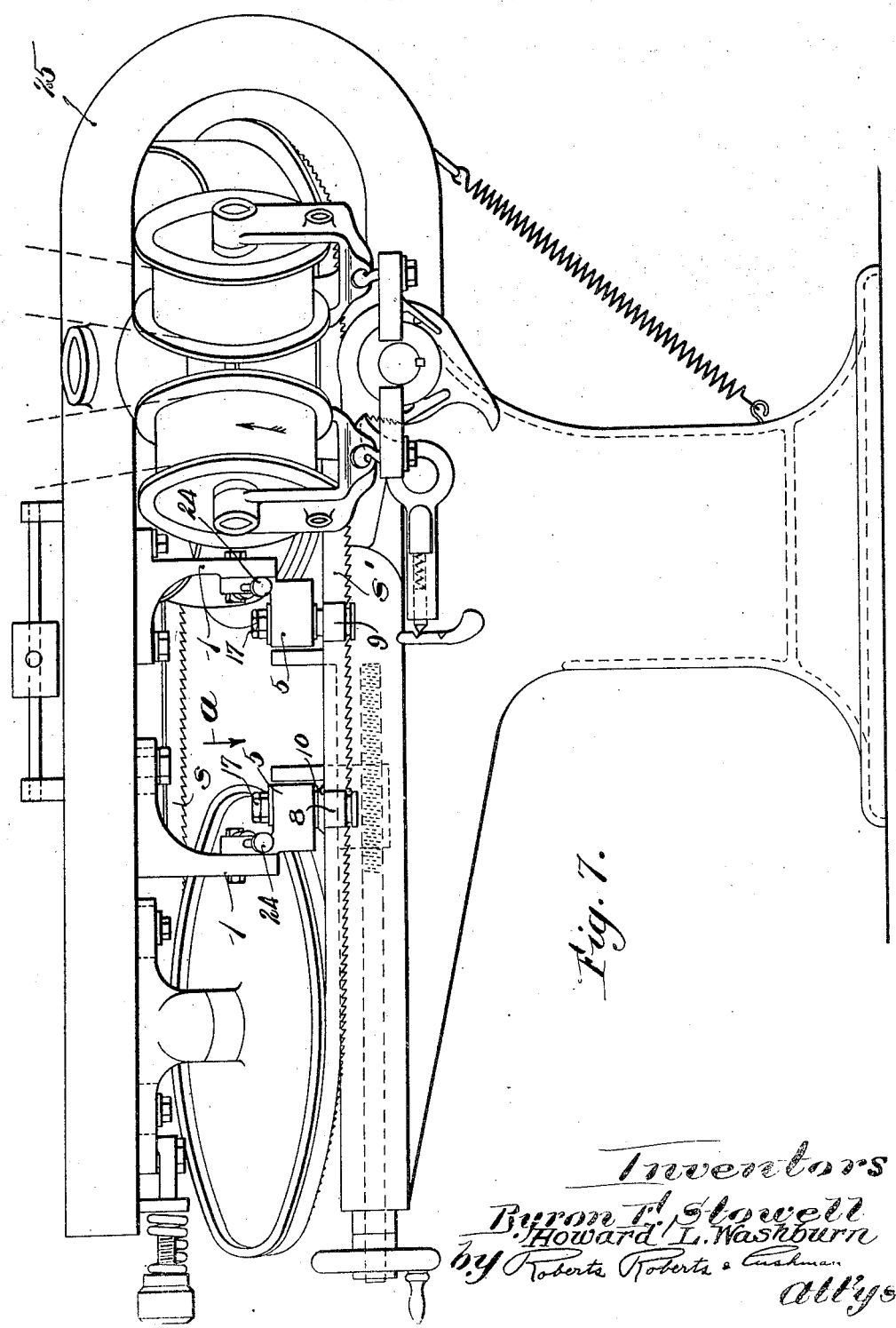

Patented Dec. 25, 1923.

1,478,774

UNITED STATES PATENT OFFICE.

BYRON F. STOWELL AND HOWARD L. WASHBURN, OF SPRINGFIELD, MASSACHUSETTS, ASSIGNORS TO METAL SAW AND MACHINE COMPANY, INC., OF SPRINGFIELD, MASSACHUSETTS, A CORPORATION OF MASSACHUSETTS.

GUIDE DEVICE FOR BAND CUTTERS.

Application filed March 8, 1921. Serial No. 450,793.

*To all whom it may concern:*

Be it known that we, BYRON F. STOWELL and HOWARD L. WASHBURN, citizens of the United States of America, and residents of Springfield, in the county of Hampden and State of Massachusetts, have invented new and useful Improvements in Guide Devices for Band Cutters, of which the following is a specification.

This invention relates to band cutting machines, for instance to band sawing machines of the types shown, described and claimed in the patents to Charles Napier No. 935,395, September 28, 1909, and No. 1,360,972, dated November 30, 1920, and to Byron F. Stowell No. 1,390,469, September 13, 1921; No. 1,414,230, April 25, 1922; No. 1,421,107, July 27, 1922; and 1,434,235, October 31, 1922; in which the saw circulates in a plane at an angle to lateral motion given the saw for the purpose of causing it to approach and enter the work. Wherever flexible metallic band knives, saws or other cutters are employed, it is desirable to support and guide the run of the flexible metal band at and near the place where it encounters the work. In the situations above suggested, it has heretofore been the practice to guide the operative length or run of the saw at two points on one run of the saw between the peripheries of the wheels upon which it is held and by one of which it is driven, and the work. This prior means for guiding the saw as usually constructed is constituted of a pair of rolls, one of which is flanged to overlap a portion of the other, these rolls being mounted to run on parallel axes and having their operative ends free so that effectively these rolls support the back and sides of the running band or saw at points respectively on each side of the place of encounter of the band or saw with the work.

In machines of the Napier type as illustrated by the Napier patent and the Stowell patents above referred to, the saw guides are relied upon not only to position the saw longitudinally and laterally, but also to turn the saw in a torsional sense so as to bring it into a plane perpendicular to the axis of motion of the saw frame relied upon to feed the saw into the work. Adjustment of the saw accurately to occupy such a plane is a necessity to accurate operation, since the lateral entering or feeding motion of the saw naturally must be in correspondence with the widthwise position of the saw blade when it is in contact with the work, to avoid binding the saw in its kerf.

As heretofore provided roller guides for band saws for the above and other purposes have been defective in setting up strains on the saw blades and especially in placing the saw blades unnecessarily under longitudinal tension. One consequence of this has been a higher rate of breakage of saws than should have been attained, and another consequence has been a considerable reaction of the saw tending to throw the roller guides out of adjustment and causing maladjustment of the saw in the hands of careless workmen.

One object of the present invention is to provide roller guides for the active run of belt or band cutting tools such as saws capable of supporting the cutter against the reaction of the work and capable of guiding the operative run of the cutter or saw without imposing upon the cutter or saw undue tensile stress. Another object of the invention is to provide a device of this nature which can be accurately adjusted by relatively unskilled persons, and which will maintain itself in adjustment during long times without attention. Another object of the invention is to provide means cooperating with a guide device of this type for the purpose of preventing injury to the guide device and to the saw or other cutter by chips, sand or slag crystals sometimes encountered in the rough cutting of castings.

The invention will now be described in connection with one specific form illustrating the invention. In the accompanying drawings, Fig. 1 is a plan of one of the guide brackets;

Fig. 2 is a face elevation of one of the roller guides showing the guides proper in vertical section on the plane 2—2, of Fig. 1;

Fig. 3 is a front elevation of one of the guide brackets;

Fig. 4 is a side elevation of a corresponding roller guide and its mounting;

Fig. 5 is an elevation, partly in vertical section, in the nature of a diagram illustrating a feature of the device;

Fig. 6 is a diagram in plan further illustrating the operation of the device, and Fig. 7 is a side elevation of a band saw machine embodying the present invention.

Referring now to Figs. 5 and 6, in machines of the general type improved the band saw $s$ is carried about a driving wheel and an idler tension wheel rotating in a plane at a substantial angle to the axis of rotation of the frame upon which these wheels are mounted; and motion of this frame is utilized to bring one run of the saw between the peripheries of the wheels by which it is guided into contact with the work, and to feed the saw into the work. As shown in Fig. 5, the motion of the saw into the work is in the direction of the arrow $a$ and the active run of the saw $s'$, unless interfered with by guides or other expedients will not be in coincidence with the plane $b$ of the motion of the saw. The saw $s$, being flexible and resilient, is adapted to be turned into coincidence with the plane $b$ by guides coacting with the free operative run of the saw at spaces on either side of the place of its encounter with the work. As best shown in Figs. 1, 3 and 4 of the Napier patent 1,360,972, brackets 48, 49, on the saw frame are provided with rollers 50, 50, defining the vertical plane corresponding to the plane $b$ of Fig. 5 herein. The bracket on which the rolls 50 have a relatively fixed mounting is adapted to be rotated for adjustment purposes about centers established by a pivot bolt taking into the bracket 48 and the bracket 49, respectively, each at a point considerably above and to the right of the saw. Under these circumstances rotative adjustment of the saw guides necessarily results in displacing the gap between the guide rolls from the natural line of the saw between the peripheries of its guide wheels 31, 33 of said patent. This inconsistency between proper rotative adjustment and proper lateral position is characteristic of the prior art, so far as we are aware.

Since it is necessary to turn the saw through about 20°, more or less, torsionally, with respect to the plane of its circulating motion, there are considerable forces tending to displace the saw-guides, and, when, as in the prior patent, the adjustment of the saw in the torsional sense implies or necessitates also bending the saw away from the straight run it naturally assumes between the peripheries of its guide wheels, difficulty is found in maintaining the adjustment as well as in changing the adjustment without changing, sometimes detrimentally, the tension on the saw blade. The present invention provides a way of guiding a band cutter situated as in the said Napier patent by means adapted not to displace the saw at all from its natural run between the peripheries of its guide wheels, and which means are also adapted to turn the saw into coincidence with the plane of its lateral motion about the natural torsional center of the saw blade. So turning the saw subjects it to a minimum of strain, and subjects the guide devices proper to a minimum tendency to displacement by the reactions of the saw into position out of adjustment.

This will best be understood by reference to Fig. 5, from which it will be apparent that positioning of the saw by guide rolls encountering it on either face can best be achieved by rotating the guide rolls about the intersection of plane $b$ with the plane $c$ radial to the pivotal axis of motion of the saw and intersecting the plane $b$ in the median central line $x$ of the saw.

In the preferred embodiment, the saw frame 25 (corresponding to the part 25 of the said Napier patent) is provided with strong relatively fixed depending brackets 1, see Figs. 2, 4, and 7, each of which is bored and tapped for one of the hold down bolts 2. The brackets 1, are faced off as at 4, Figs. 2 and 4, to provide seats for the mountings 5, for the roller-guides proper.

These mountings 5 each comprises a stiff L-shaped casting having a machined face to fit on the face 4, and vertically bored at 6, 6, to receive, with a large clearance, the upwardly extending integral stems, 7, 7, of guide rolls 8, 9. The guide roll 8 is provided with a flange 10 overlapping a shoulder 11 of the roll 9, and both rolls may be provided with peripheral shallow grooves 12, to avoid encounter with the offset teeth of the band saw traveling between them.

The flange 10 of roll 8 receives the upward re-active thrust of the saw and the upper side of this flange bears against the lower machined surface 13 of the bracket 5.

The lateral, and if desired part or all of the vertical thrust on the guide rolls 8, 9, is taken by ball bearings 14, 15 mounted loosely in suitable recesses of the bore 6. The outer ball-races 15 of these bearings may be a loose running fit for the prevention of eccentric wear by turning movements in their recesses.

The upper ends of the stem 7 are shouldered and threaded for a cap washer 16 and lock nuts 17. Preferably the upper face of each roll 8, 9, is grooved to receive a lubricant-absorbing washer 18.

As best shown in Fig. 1, the centers of the stems 7, 7, stand slightly out of perpendicular line in respect to the saw $s$, and the gap 20 between adjacent faces of the rolls is preferably slightly less than the width of the saw. The pressure point of the periphery of each of the rolls 8 and 9, on the saw is thus displaced from that of the other roll of the pair, and the saw curves laterally through a very slight extent at passage of the guide rolls. Within limits, this provision enables saws of different thickness to be efficiently guided by rolls not capable of adjustment in respect to the distances between their axes.

In the preferred construction the brackets 1, are each provided with the studs 21, 21, in such a relation to the hold down bolt 2 as to define three points of an arc central at the line $x$ of a saw guided by the rolls 8, 9. The upstanding portion 22 of the bracket 5 is provided with a sector slot 23 concentric with this point and the construction may include adjustment screws 24, 24, adapted to react with studs 21, 21, for rotating the bracket 5 into its adjustment with respect to the hold down screw 2 and the studs 21, and about the point $x$ as a center. This construction therefore provides adjustment for the degree of torsion of the saw $s$ in respect to its axis of torsion, without lateral motion of the gap 20 between the rolls in respect to the natural position of the saw. It will be apparent that the adjustment screws 24, while convenient, are not essential to adjusting the bracket.

When adjustment has been reached with respect to the coincidence of the active run of the saw with the plane $b$, Fig. 5, the hold down bolt 2 is locked to retain the adjustment.

One or both of the brackets 5 may carry as an attachment a depending hanger 30 having therein a slot 31 adapted to straddle the saw $s$ and having thereon felt wipers 32, to sweep the saw. The bracket 30 is attached at the entrance side of the rolls, and has as its effect to remove from the saw chips, sand, slag crystals, and other detrimental things picked up at its passage through the work. Since usual practice requires copious lubrication of the saw and the work at the place of the cut, the wipers 32, following the work in the direction of motion of the saw, may also be relied upon to remove most of the lubricant and return it to the drip-catcher devices of the sawing machine proper, not shown.

What we claim is:—

1. In a cutting machine of the kind employing an endless band cutter and having therein means for circulating the cutter in a plane and means for moving the plane of circulation of the cutter transversely of and at an angle to said plane to feed the cutter into the work, in combination guiding devices for the run of the cutter in contact with the work constructed and arranged to be rotated about the median line of the cutter at said run, and means for retaining said guiding devices in one rotative position.

2. A guide device for use in cutting machines employing endless band cutters having therein in combination with the usual means for supporting and for circulating the cutter in a given plane and for moving the plane of circulation of the cutter transversely of and at an angle to said plane for feeding the cutter into the work, guiding means comprising rollers, a mounting in which said rollers have bearings respectively at each side of the run of the saw, and means for adjusting the mounting and rollers about a center lying between the rollers and substantially in the axis of torsion of the band guided thereby.

3. A guide device for use in a cutting machine having a movable frame supporting an endless band cutter and means for swinging the frame to feed the cutter into the work, comprising a bracket supported by the frame, a mounting carried by the bracket supporting spaced guide rolls, bearings for said rolls determining their rotation about substantially parallel axes, means for swinging the mounting with its bearings and rolls as a unit about a center lying between the rolls, and means for fixing the mounting in adjusted position relatively to the bracket.

4. A roller guide for band cutters comprising spaced rolls, a mounting for the rolls, means on one of said rolls for limiting endwise motion of the other adapted to serve as a stop for a band cutter entered between said rolls, and means for adjustably supporting said mounting and rolls in a predetermined fixed relation to the normal plane of the median longitudinal line of a run of a band cutter.

5. A roller guide for band cutters comprising spaced rolls having integral axial stems, a mounting for the rolls, ball bearings between said stems and mounting, means on one of said rolls for limiting endwise motion of the other adapted to serve as a stop for a band centered between said rolls, and means for supporting said frame and rolls in a predetermined relation to the normal plane of the median longitudinal line of a run of a band cutter.

6. A roller guide for band cutters comprising a pair of spaced rolls mounted for rotation on axes having a fixed spaced relation, a mounting for the rolls having therein an arcuate slot central at a point in the space between the adjacent peripheries and between the ends of the rolls, guide means within the slot permitting the mounting and rolls to be rotatively adjusted about said point as a center, and means for securing the mounting in adjusted position.

7. A roller guide for band cutters comprising a pair of spaced rolls mounted for rotation on axes having a fixed spaced relation.

one of said rolls having an inner end flange overlapping the inner end of the other roll, and an adjustable mounting for the rolls having therein an arcuate slot central at a point in the space between the adjacent peripheries and between the ends of the rolls, and securing means taking into the arcuate slot for holding the mounting in adjusted position.

8. In a band cutting machine, the combination of spaced guide rolls with a mounting therefor adapted to support the rolls with a line joining their axes at an angle other than a right angle to the direction of the band cutter, said mounting comprising means for rotatively adjusting the rolls about the longitudinal center line of the band cutter as a center, and in a plane at right angles thereto.

9. In a band cutting machine, the combination with a driven band cutter of a roller guide comprising spaced guide rolls and a mounting therefor adapted to support the rolls with a line joining their axes at an angle other than a right angle to the direction of the band cutter, said mounting comprising means for rotatively adjusting the rolls about the longitudinal center line of the band cutter as a center and in a plane at an angle thereto.

10. In a roller guide for band cutters, the combination of a mounting comprising bearings for the guide rolls, with guide rolls journaled therein, a wiper for the cutter mounted on the bearing frame, and means whereby the mounting, the rolls, and the wiper may be rotated together in respect to the longitudinal center line of the cutter.

11. A roller guide for use in a cutting machine having a movable frame supporting an endless band cutter and means for swinging the frame to feed the cutter into the work, a bracket secured to the frame, a roller mounting having a pair of guide rolls spaced to receive the band cutter between them, said mounting having an arcuate slot whose center of curvature is at a point in the space between the adjacent peripheries and between the ends of the rolls, a pair of studs projecting from the bracket into the slot for guiding the mounting in swinging about the center of curvature of the slot as an axis, and a bolt also passing through the slot for retaining the mounting in adjusted position.

Signed by us at Springfield, Massachusetts, this third day of March, 1921.

BYRON F. STOWELL.
HOWARD L. WASHBURN.